(12) United States Patent
Takemura et al.

(10) Patent No.: US 7,318,600 B2
(45) Date of Patent: Jan. 15, 2008

(54) PASSENGER PROTECTIVE DEVICE

(75) Inventors: Naoki Takemura, Wako (JP);
Hidetoshi Utsumi, Wako (JP); Takashi Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/419,075

(22) Filed: May 18, 2006

(65) Prior Publication Data

US 2006/0267316 A1    Nov. 30, 2006

(30) Foreign Application Priority Data

May 24, 2005    (JP)    ............................. 2005-151575

(51) Int. Cl.
*B60R 21/16* (2006.01)

(52) U.S. Cl. ................. 280/728.2; 280/730.2

(58) Field of Classification Search ............ 280/728.2, 280/728.3, 730.2
See application file for complete search history.

(56) References Cited

U.S. PATENT DOCUMENTS

| | | | |
|---|---|---|---|
| 6,070,902 A * | 6/2000 | Kowalski et al. ........ | 280/730.2 |
| 6,485,048 B2 * | 11/2002 | Tajima et al. ............ | 280/728.2 |
| 6,601,871 B2 * | 8/2003 | Fischer .................... | 280/730.2 |
| 6,669,226 B2 * | 12/2003 | Fowler et al. ........... | 280/728.2 |
| 6,793,239 B2 * | 9/2004 | Feldman et al. ........... | 280/729 |
| 6,893,045 B2 * | 5/2005 | Inoue et al. ................ | 280/753 |
| 7,052,037 B2 * | 5/2006 | Nakayasu et al. ........ | 280/730.2 |
| 7,172,212 B2 * | 2/2007 | Aoki et al. ............... | 280/730.2 |
| 7,185,913 B2 * | 3/2007 | Bakhsh et al. ............ | 280/730.1 |
| 2003/0127842 A1 * | 7/2003 | Pywell ...................... | 280/753 |
| 2006/0061071 A1 * | 3/2006 | Noguchi et al. ......... | 280/730.2 |
| 2006/0061075 A1 * | 3/2006 | Aoki et al. ............... | 280/730.2 |

FOREIGN PATENT DOCUMENTS

JP    10-138857    5/1998

* cited by examiner

*Primary Examiner*—Paul N. Dickson
*Assistant Examiner*—Toan C. To
(74) *Attorney, Agent, or Firm*—Rankin, Hill, Porter & Clark LLP (57) ABSTRACT

Curtain-shaped bag bodies 26, 27 are expanded and developed inside a vehicle room on windows of a vehicle. The bag bodies 26, 27 are expanded and developed by a plurality of inflaters 26, 27, and the plurality of inflaters 26, 27 are arranged in the same interior material being well organized.

8 Claims, 6 Drawing Sheets

PASSENGER PROTECTIVE DEVICE

BACKGROUND OF THE INVENTION

The present invention relates to a passenger protective device for expanding and developing a bag body into a curtain-shape on a window of a vehicle inside a vehicle room.

A technique relating to a passenger protective device is disclosed in which a curtain-shaped bag body is expanded and developed inside a vehicle room on a window of a vehicle side portion at the time of a side collision of the vehicle. According to this technique, in order to smoothly develop the bag body in a short period of time, two inflaters are longitudinally arranged for one bag body. Concerning this technique, for example, refer to Patent Document 1.

[Patent Document 1]
JP-A-10-138857 (FIG. 13 on pages 5 to 6)

However, in the above structure in which a plurality of inflaters are respectively, separately arranged, the following problems may be encountered. The number of man-hours necessary for incorporating the inflaters are increased. Further, a space necessary for arranging the inflaters is enlarged. Furthermore, the number of parts for attaching the inflaters is increased.

SUMMARY OF THE INVENTION

Accordingly, it is an object of the present invention to provide a passenger protective device capable of reducing the number of man-hours at the time of incorporating inflaters, the space in which the inflaters are arranged and the number of parts necessary for attaching the inflaters.

In order to accomplish the above object, according to the aspect 1 of the present invention, there is provided with a passenger protective device (for example, a curtain air bag device 11 in an embodiment) including: a bag body (for example, a front bag body 16 and a rear bag body 27 in the embodiment) to be expanded and developed into a curtain-shape inside a vehicle room on a window (for example, a front side window 31, a rear side window 33 and a rear quarter window 34 in the embodiment) of the vehicle; a plurality of inflaters (for example, inflaters 37, 38 in the embodiment) for expanding and developing the bag body; and an interior material (for example, a pillar garnish 69, a roof garnish 71 and a pillar garnish 80 in the embodiment) for arranging the plurality of inflaters well organized therein.

According to the aspect 2 of the present invention, there is provided with the passenger protective device according to the aspect 1, wherein a plurality of bag bodies are provided corresponding to the plurality of inflaters.

According to the aspect 3 of the present invention, there is provided with the passenger protective device according to the aspect 2, wherein a plurality of bag bodies are provided in a vehicle side portion corresponding to a plurality of windows arranged in the longitudinal direction.

According to the aspect 4 of the present invention, there is provided with the passenger protective device according to one of the aspects 1 to 3, wherein the plurality of inflaters are integrally attached to a vehicle body by a common bracket (for example, a bracket 40 in an embodiment).

According to the aspect 5 of the present invention, there is provided with the passenger protective device according to one of the aspects 1 to 4, further including: a plurality of pipes (for example, pipes 48, 58 in the embodiment) for connecting the plurality of inflaters with the bag bodies crossing each other.

According to the invention described to the aspect 1, a plurality of inflaters for expanding and developing a bag body are arranged in the same interior material being well organized. Therefore, the plurality of inflaters can be incorporated being well organized. Accordingly, a space in which the plurality of inflaters are arranged and parts necessary for attaching the plurality of inflaters can be used in common. Accordingly, it is possible to reduce the number of man-hours at the time of incorporating the inflaters, the space in which the inflaters are arranged and the number of parts necessary for attaching the inflaters. Further, a bag body, which is expanded and developed into a curtain-shape inside a vehicle room on a window, is expanded and developed by a plurality of inflaters. Accordingly, it becomes possible to more preferably control the development of the bag body, and it also becomes possible to downsize the individual inflaters.

According to the invention described in the aspect 2, a plurality of bag bodies, which are expanded and developed into a curtain-shape inside a vehicle room on a window, are arranged corresponding to a plurality of inflaters. Therefore, the respective bag bodies can be expanded and developed by the respective inflaters, and control of developing the bag bodies can be more preferably conducted.

According to the invention described in the aspect 3, a plurality of bag bodies, which are expanded and developed into a curtain-shape inside a vehicle room on a window, are arranged corresponding to a plurality of windows in the longitudinal direction in a side portion of a vehicle. Therefore, windows on the side can be widely, positively covered.

According to the invention described in the aspect 4, a plurality of inflaters are integrally attached to a vehicle body by a common bracket. Therefore, the plurality of inflaters can be incorporated being well organized. Accordingly, a space in which the plurality of inflaters are arranged and parts necessary for attaching the plurality of inflaters can be used in common. Consequently, it is possible to reduce the number of man-hours at the time of incorporating the inflaters, the space in which the inflaters are arranged and the number of parts necessary for attaching the inflaters.

According to the invention described in the aspect 5, a plurality of pipes for connecting the plurality of inflaters with the bag bodies are arranged while crossing each other. Therefore, angles of the pipes can be made gentle, and there is no possibility that the pipes are given a redundant internal pressure. Further, fluid smoothly flows in the pipes. Furthermore, angles of the pipes become gentle, and a joining portion of the pipe to the bag body can be made straight. This joining portion is clamped by a machine. At the time of clamping this joining portion, it is possible to provide a sufficiently large space for the work conducted by the machine. Since the pipes are gently curved, it is easy to manufacture the pipes.

DETAILED DESCRIPTION OF THE PREFERRED EMBODIMENTS

Referring to the drawings, a passenger protective device of an embodiment of the present invention will be explained below.

Figure 1:
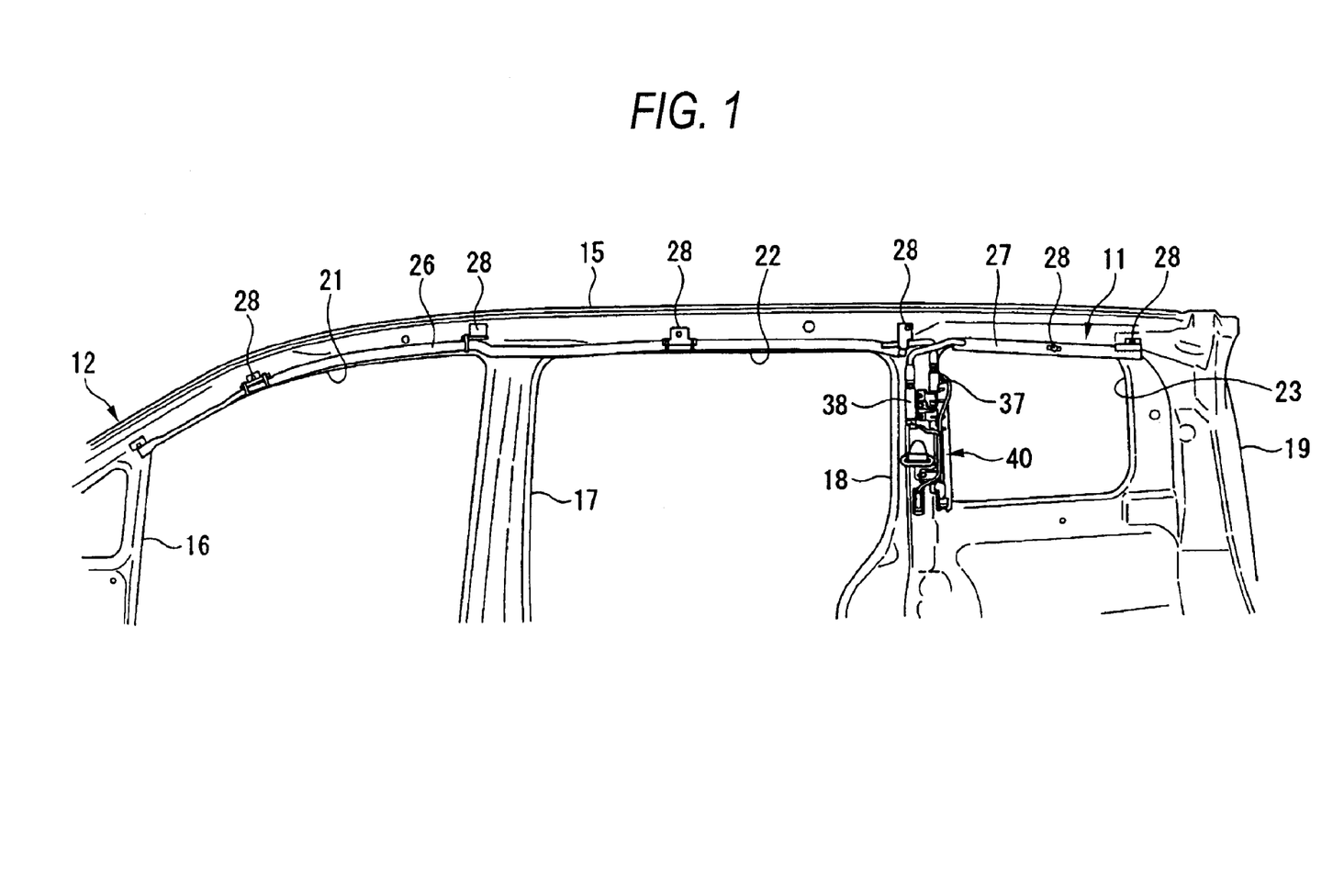
FIG. 1 is a side view showing a right side portion of a vehicle body to which a passenger protective device of an embodiment of the present invention is applied, wherein this view is taken from the inside of a vehicle room.

FIG. 1 is a partial side view showing a right side portion of a vehicle body 12 of a vehicle to which a curtain air bag device 11, which is a passenger protective device of this embodiment, is applied, wherein this view is taken from the inside of a vehicle room. In this connection, although not shown in the drawing, the same curtain air bag device 11 is arranged in a left side portion of the vehicle body 12.

As shown in FIG. 1, a front pillar 16, a center pillar 17, a rear quarter pillar 18 and a rear pillar 19 are connected to a roof side rail 15 in this order from the forward end side of the vehicle, which forms a side end portion of a roof of a vehicle body 12 and is arranged in the longitudinal direction of the vehicle, in such a manner that these components are extended downward. In the vehicle body 12, between the front pillar 16 and the center pillar 17, a door opening portion 21 of the front door is formed. Between the center pillar 17 and the rear quarter pillar 18, a door opening portion 22 of the rear door is formed. In an upper portion between the rear quarter pillar 18 and the rear pillar 19, an opening portion 23 is formed.

In the curtain air bag device 11 of the present embodiment, inside the vehicle room with respect to the roof side rail 15, two front portion bag bodies 26 and rear portion bag bodies 27 are attached along the roof side rail 15 via a plurality of attaching members 28 under the condition that the bag bodies are respectively folded into a lengthy shape.

Figure 2:
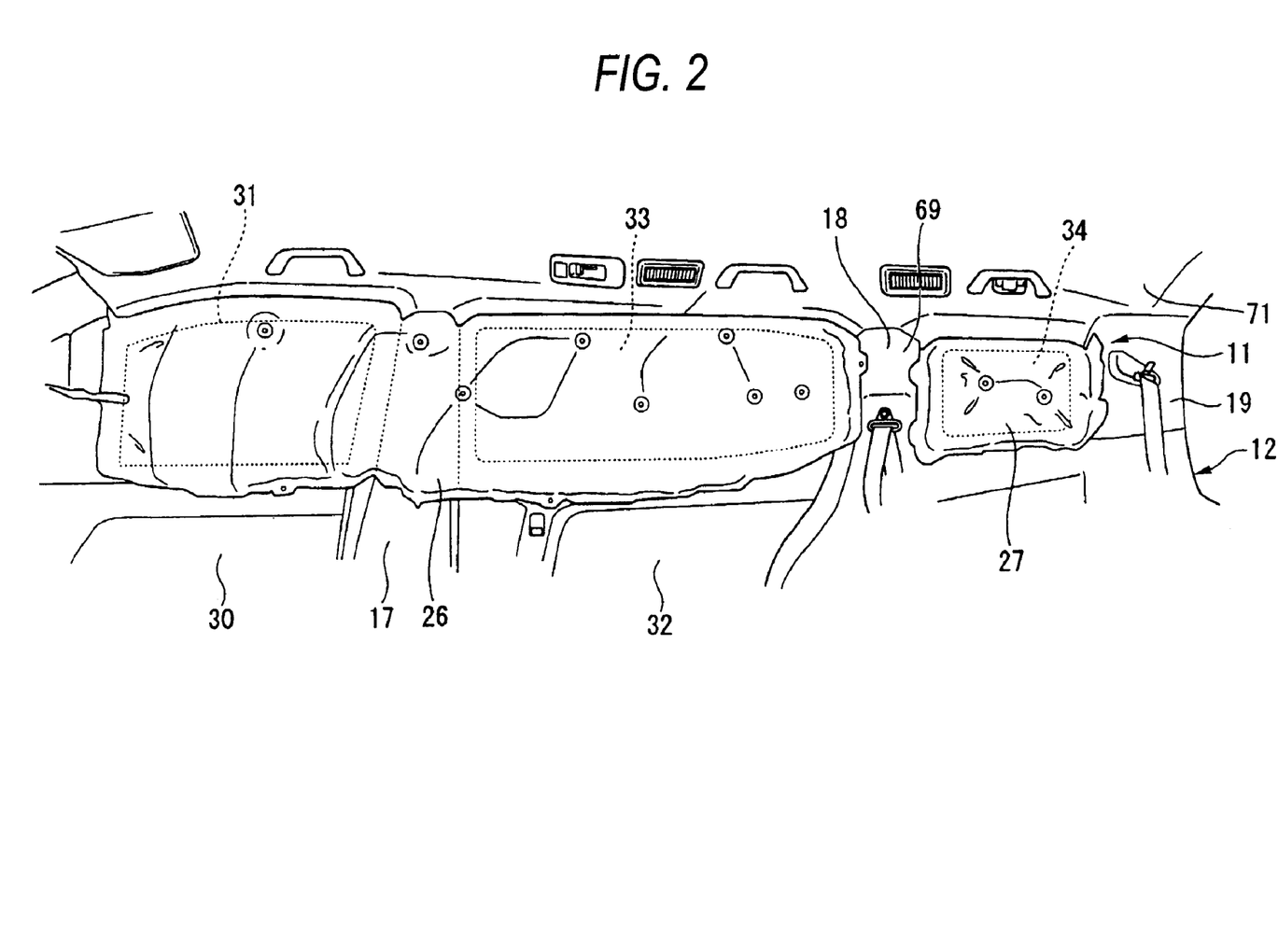
FIG. 2 is a side view showing a right side portion of a vehicle body showing a state of expansion and development of a bag body in a passenger protective device of an embodiment of the present invention, wherein this view is taken from the inside of a vehicle room.

The bag body 26 is attached to upper ranges of the front and the rear door opening portion 21, 22 of the roof side plate 15. As shown in FIG. 2, the bag body 26 is expanded and developed as follows. The bag body 26 is developed into a curtain-shape inside a vehicle room on the front side window 31, which is arranged in an upper portion of the front door 30 for closing the door opening portion 21, and on the rear side window 33, which is arranged in an upper portion of the rear door 32 for closing the door opening portion 22. That is, the front bag body 26 covers a side portion of a passenger seated in the first row seat not shown in the drawing and a side portion of a passenger seated in the second row seat not shown in the drawing. On the other hand, as shown in FIG. 1, the rear bag body 27 is attached in an upper range of the opening portion 23 of the roof side rail 15. As shown in FIG. 2, in the expansion and development of the rear bag body 27, it develops into a curtain shape inside the vehicle room on the rear quarter window 34 for closing the opening portion 23. That is, the rear bag body 27 covers a side portion of a passenger seated in the third row seat not shown in the drawing. As described above, a plurality of bag bodies including the front bag body 26 and the rear bag body 27 are arranged corresponding to a plurality of windows including the front side window 31, the rear side window 33 and the rear quarter window 34 which are arranged in the longitudinal direction on both side portions of the vehicle.

Figure 3:
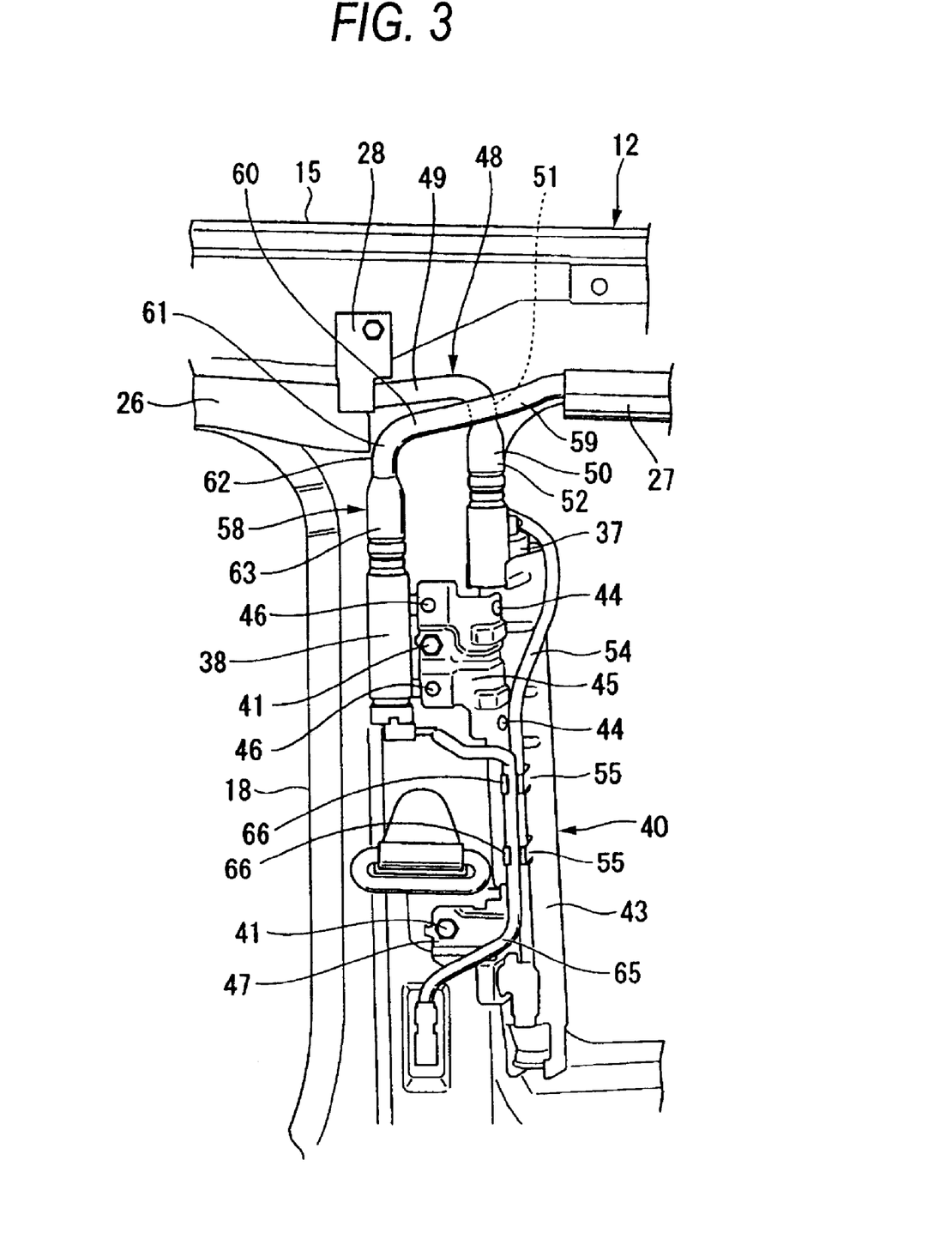
FIG. 3 is a partial enlarged view showing a primary portion of a passenger protective device of an embodiment of the present invention, wherein interior material is omitted in this view.

In this case, as shown in FIG. 3, the front bag body 26 is connected to an inflater 37 which is exclusively used for expanding and developing the front bag body 26, and the rear bag body 27 is connected to an inflater 38 which is exclusively used for expanding and developing the front rear body 27. That is, the front bag body 26 and the rear bag body 27 are expanded and developed by a plurality of inflaters 37, 38. Further, a plurality of bag bodies including the front bag body 26 and the rear bag body 27 are provided respectively corresponding to a plurality of inflaters 37, 38.

The plurality of inflaters 37, 38 are attached to a rear quarter pillar 18 of the vehicle body 12 via a common bracket 40. This bracket 40 is attached to a rear edge portion side of the rear quarter pillar 18 in the longitudinal direction of the vehicle by bolts 41 and formed into a shape which is long in the vertical direction. The bracket 40 includes: a support portion 43 which is arranged in the substantially entire range in the vertical direction on the rear edge portion side of the rear quarter pillar 18 and which supports the inflater 37 for driving the front bag body, the posture of which is arranged in the vertical direction; and a support portion 45 fixed by rivets 44 under the condition that the support portion 45 extends to the front side in an upper portion on the front edge side in the longitudinal direction of the vehicle of the support portion 43. The inflater 38 for driving the rear bag body is attached to the front edge portion side of the support portion 45 by rivets 46. The bracket 40 includes an attaching portion 47 which is fixed by rivets not shown under the condition that the bracket 40 extends to the front side in a lower portion on the front edge side in the longitudinal direction of the vehicle of the support portion 43. The bracket 40 is fixed to the rear quarter pillar 18 by bolts 41 in the support portion 45 and the attaching portion 47. A compression gas charging type inflater, the length of which is long so that it can cope with a larger capacity of the front bag body 26, is used for the inflater 37 for driving the front bag body. A small combustion type inflater, the length of which is short so that it can cope with a relatively small capacity of the rear bag body 27, is used for the inflater 38 for driving the rear bag body.

Figure 4:
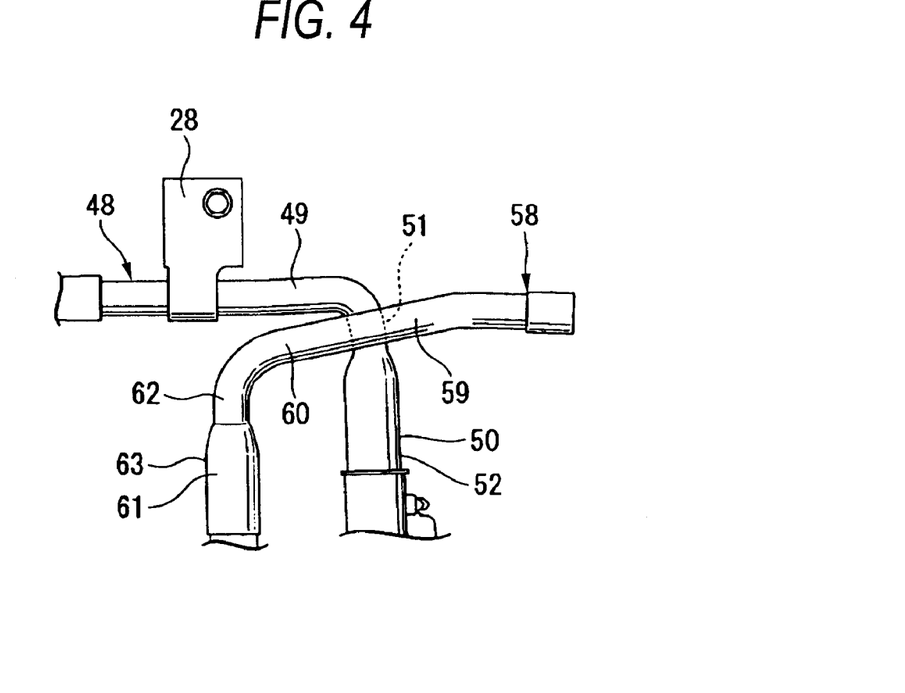
FIG. 4 is a side view showing a crossing portion of pipes of a passenger protective device of an embodiment of the present invention, wherein this view is taken from the inside of a vehicle room.
Figure 5:
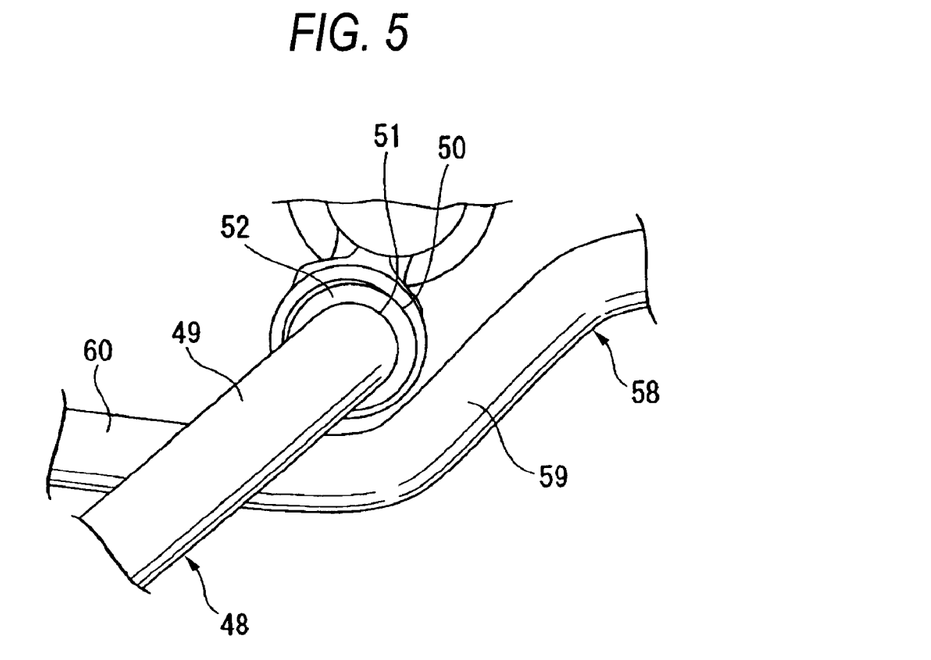
FIG. 5 is a plan view showing a crossing portion of pipes of a passenger protective device of an embodiment of the present invention.

A pipe 48 for connecting the inflater 37, which drives the front bag body, with a rear end portion of the front bag body 26 is attached to an upper portion of the inflater 37. This pipe 48 includes: an inclined rear extending pipe portion 49 extending a little to the rear side from the rear end portion of the front bag body 26 while it is inclined so that the rear side can be located at a position outside in the vehicle width direction as shown in FIG. 5; and a lower extending pipe portion 50 extending downward from a forward end portion of this inclined rear extending pipe portion 49 at a position close to the rear end edge portion of the rear quarter pillar 18 as shown in FIGS. 3 and 4. Therefore, the pipe 48 is formed into a curved shape. The lower extending pipe portion 50 includes: a small diameter portion 51, which is arranged in an upper portion, the diameter of which is the same as that of the inclined rear extending pipe portion 49; and a large diameter portion 52, which is arranged in an lower portion, the diameter of which is larger than that of the small diameter portion 51, the large diameter portion 52 being connected to the inflater 37. The inflater 37 is connected with a cable 54 used for drive control. This cable 54 is engaged with the bracket 40 by a plurality of engaging pieces 55 formed in the support portions 43.

A pipe 58 for connecting the inflater 38, which drives the rear bag body, with a front end portion of the rear bag body 27 is attached to an upper portion of the inflater 38. This pipe 58 includes: an inclined front extending pipe portion 59 extending to the front side from the front end portion of the rear bag body 27 while it is inclined so that the front side can be located at a position inside in the vehicle width direction as shown in FIG. 5; a front extending pipe portion 60 extending in the longitudinal direction of the vehicle substantially in parallel from a forward end portion of this inclined front extending pipe portion 59; and a lower extending pipe portion 61 extending downward from a forward end portion of this front extending pipe portion 60 at an intermediate position of the rear quarter pillar 18 as shown in FIGS. 3 and 4 and connected to the inflater 38. That is, the pipe 58 is formed into a curved shape. The lower extending pipe portion 61 includes: an inclined front extending pipe 59; a small diameter portion 62, which is arranged in an upper portion, the diameter of which is the same as that of the front extending pipe 60; and a large diameter portion 63, which is arranged in an lower portion, the diameter of which is larger than that of the small diameter portion 62, the large diameter portion 63 being connected to the inflater 38. The inflater 38 is connected with a cable 65 used for drive control. This cable 65 is engaged with the bracket 40 by a plurality of engaging pieces 66.

In this case, as shown in FIGS. 4 and 5, concerning the pipe 58 used for the rear bag body 27, the inclined front extending pipe portion 59, the diameter of which is small, extends to the front side so that the front side can be located inside in the vehicle width direction as described above, and the front extending pipe portion 60, the diameter of which is small, extends substantially in parallel in the longitudinal direction of the vehicle on the front side. The pipe 58 used for the rear bag body 27 is laid inside in the vehicle width direction of the small diameter portion 51 in the upper portion of the lower extending pipe 50 of the pipe 48 used for the front bag body 26 while the pipe 58 used for the rear bag body 27 is coming close to the small diameter portion 51. At this time, when a view is taken from the inside of the vehicle room, the pipe 58 is arranged so that it can cross the small diameter portion 51 along the vertical direction of the pipe 48 in a boundary portion of the inclined front extending pipe portion 59 and the front extending pipe portion 60. When a view is taken from an upper portion, the pipe 58 is laid so that it can cross the inclined rear protruding pipe portion 49 extending to the rear while it is inclined so that the rear side of the pipe 48 can be located outside in the vehicle width direction in the front extending pipe portion 60 extending substantially in parallel with the longitudinal direction of the vehicle. That is, a plurality of pipes 48, 58 for connecting a plurality of inflaters 37, 38 with the front bag body 26 and the rear bag body 27 are arranged so that they can cross each other.

Figure 6:
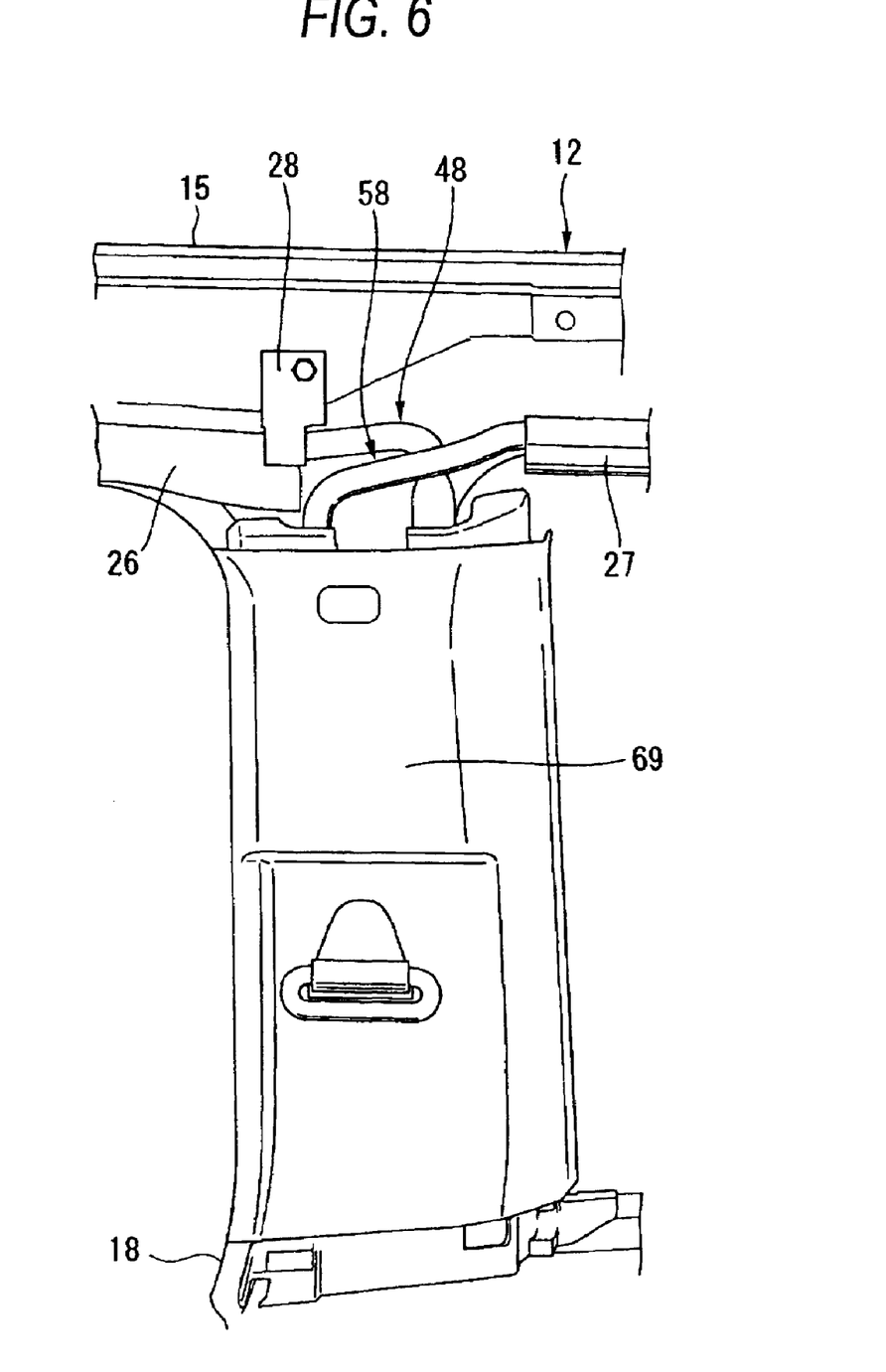
FIG. 6 is a partial enlarged view showing a primary portion of a passenger protective device of an embodiment of the present invention.

The pillar garnish (the interior material) 69 shown in FIG. 6 is attached to the rear quarter pillar 18 so that a plurality of inflaters 37, 38, which are integrally attached to the rear quarter pillar 18 by the common bracket 40 as described above, portions of the pipes 48, 58 and the cables 54, 65 can be covered with the pillar garnish 69. Due to the above structure, a plurality of inflaters 37, 38 are arranged being organized in the pillar garnish 69 which is the same interior material.

According to the curtain air bag device 11 of this embodiment described above, a plurality of inflaters 37, 38, which expand and develop the front bag body 26 and the rear bag body 27, are arranged in the same pillar garnish 69 being well organized. Further, these inflaters 37, 38 are integrally attached to the rear quarter pillar 18 of the vehicle body 12 by the common bracket 40. Therefore, assembling of these inflaters 37, 38 can be conducted being well organized. Therefore, a space in which the components are arranged can be used in common. Further, parts for attaching the components can be used in common. Accordingly, it is possible to positively reduce the number of man-hours at the time of assembling the inflaters 37, 38, the space in which the inflaters 37, 38 are arranged and the number of parts used for attaching the inflaters 37, 38. Since the front bag body 26 and the rear bag body 27 are expanded and developed by a plurality of inflaters 37, 38, development of the inflaters can be more preferably controlled, that is, the development timing, the mechanical strength and the size can be more preferably controlled. Further, the individual inflaters 37, 38 can be downsized.

Since a plurality of front bags 26 and rear bags 27 are provided corresponding to a plurality of inflaters 37, 38, the inflater 37 can expand and develop the front bag body 26, and the inflater 38 can expand and develop the rear bag body 27. Development of the inflaters can be more preferably controlled, that is, the development timing, the mechanical strength and the size can be more preferably controlled.

The front bag body 26 and the rear bag body 27, which are a plurality of bag bodies, are provided respectively corresponding to the front side window 31, the rear side window 33 and the rear quarter window 34, which are arranged in the longitudinal direction in the vehicle side portion. Therefore, the front side window 31, the rear side window 33 and the rear quarter window 34 can be widely, positively covered with the bag bodies.

As shown in FIGS. 1 and 2, the inflaters 37, 38 are arranged in the rear quarter pillar (the pillar portion) 18, and the front bag 26 and the rear bag 27, which are arranged in the longitudinal direction, cover the front side window 31, the rear side window 33 and the rear quarter window 34 which are located in the front and rear of the rear quarter pillar 18. Therefore, it is unnecessary for the front bag body 26 and the rear bag body 27 to get over the pillar garnish 69 located between the front bag body 26 and the rear bag body 27. Accordingly, there is no possibility that the bag bodies are hooked at the pillar garnish 69, that is, the bag bodies can be excellently developed. In other words, there is no possibility that the front bag body 26 and the rear bag body 27 cover the pillar garnish 69. Accordingly, the bag bodies can be excellently developed.

In addition to that, a plurality of pipes 48, 58, which connect a plurality of inflaters 37, 38 with the front bag body 26 and the rear bag body 27, are arranged crossing each other. Therefore, an angle of each pipe 48, 58 can be made gentle. Accordingly, there is no possibility that the pipes 48, 58 are given a redundant internal pressure. Further, fluid can smoothly flow in the pipes 48, 58. Further, an angle of each pipe 48, 58 can be made gentle. Accordingly, joining portions, in which the pipes 48, 58 and the front and the rear bag body 26, 27 are joined to each other, can be formed into a linear shape. This joining portion is clamped by a machine. At that time, it is possible to provide a sufficiently large space into which the machine can be set, that is, it is possible to provide a sufficiently large space in which joining work can be conducted. Since the pipes are gently curved, it is easy to manufactured them.

Figure 7:
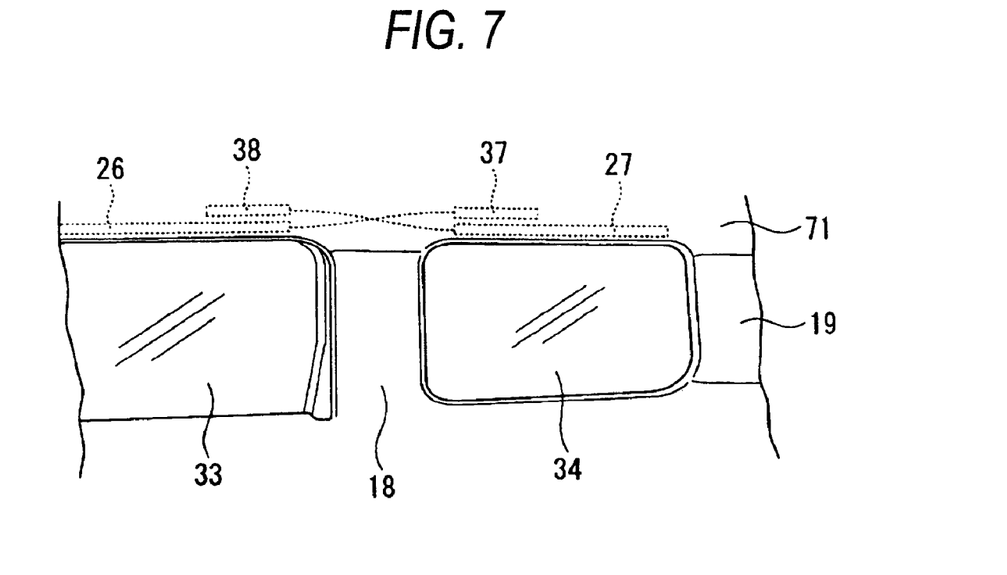
FIG. 7 is a schematic side view showing a right side portion of a vehicle to which another example of a passenger protective device of an embodiment of the present invention is applied, wherein this view is taken from the inside of a vehicle room.

In the embodiment explained above, a plurality of inflaters 37, 38 are arranged in the same pillar garnish 69 being well organized. However, it is possible to arrange the plurality of inflaters 37, 38 in the other various interior materials being organized. For example, as shown in FIG. 7, a plurality of inflaters 37, 38 may be arranged inside the same roof garnish 71 being well organized. In this case, a plurality of inflaters 37, 38 can be attached to the vehicle body side by a common bracket.

In the embodiment described above, the passenger protective device is constructed as follows. The front bag portion 26 is provided which expands and develops into a curtain shape inside the vehicle room on the front side window 31 and the rear side window 33. Inside the vehicle room on the rear quarter window 34, the rear bag body 27 expands and develops into a curtain shape. The inflaters 37, 38 for expanding and developing the bag bodies are arranged in the rear quarter pillar 18 located between the front bag body 26 and the rear bag body 27. Due to the above structure, these inflaters 37, 38 are arranged inside the pillar garnish 69, which covers the rear quarter pillar 18, being well organized. However, it is possible to adopt the following constitution.

Figure 8:
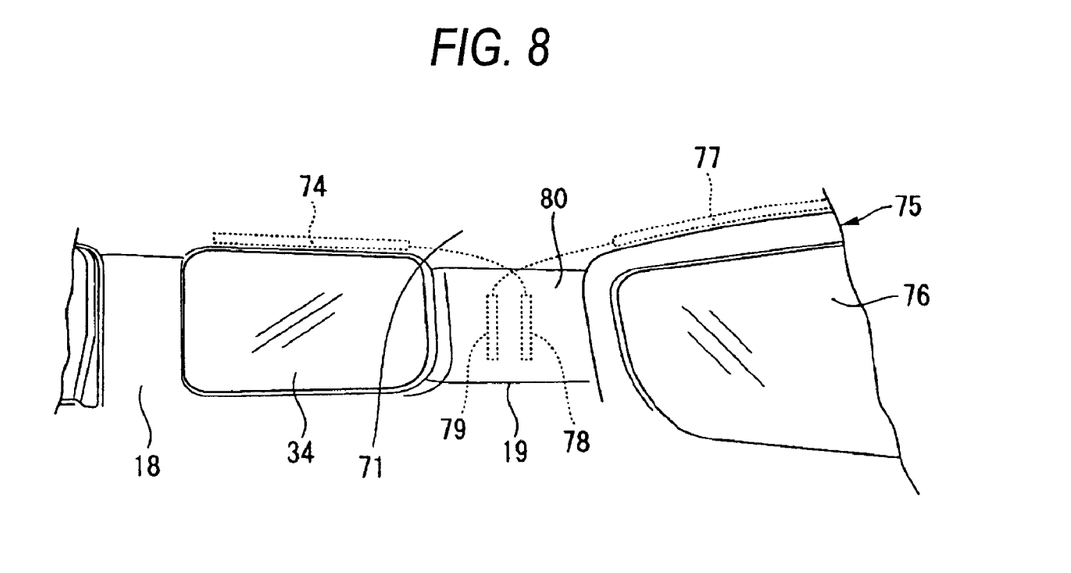
FIG. 8 is a schematic side view showing a right side portion of a vehicle to which still another example of a passenger protective device of an embodiment of the present invention is applied, wherein this view is taken from the inside of a vehicle room.

As shown in FIG. 8, a bag body 74 is provided which expands and develops into a curtain shape inside the vehicle room on the rear quarter window 34. A bag body 77 is provided which expands and develops into a curtain shape inside the vehicle room on the tail gate window 76 in an upper portion of the rear tail gate 75. An inflater 78 for expanding and developing the bag body 74 and an inflater 79 for expanding and developing the bag body 77 are attached to the rear pillar 19 located between the bag bodies 74, 77. In this way, these inflaters 78, 79 are arranged inside the pillar garnish 80, which covers the rear pillar 19, being well organized. In this case, a plurality of inflaters 78, 79 can be also attached to the rear pillar 19 by a common bracket. In this connection, the above structure can be further changed in such a manner that the inflaters 78, 79 are arranged inside the same roof garnish 71 being well organized. Further, the inflaters may be arranged at positions in the other pillar, the roof or the roof side rail.

Further, it is possible to apply the above embodiment to a case in which gas is sent from a plurality of inflaters to one bag body.

What is claimed is:

1. A passenger protective device comprising:
   a plurality of bag bodies to be expanded and developed into a curtain-shape inside a vehicle room on a plurality of windows of the vehicle, wherein the plurality of bag bodies are provided in a vehicle side portion corresponding to the plurality of windows arranged in a longitudinal direction;
   a plurality of inflaters for expanding and developing the bag bodies, wherein the plurality of bag bodies correspond to the plurality of inflaters, and wherein the plurality of inflaters are provided between the plurality of windows on a pillar; and
   an interior material for arranging the plurality of inflaters well organized therein.

2. The passenger protective device according to claim 1, wherein
   the plurality of inflaters are integrally attached to the pillar between the plurality of windows by a common bracket.

3. The passenger protective device according to claim 1, further comprising:
   a plurality of pipes for connecting the plurality of inflaters with the bag bodies crossing each other.

4. A passenger protective device comprising:
   bag bodies to be expanded and developed into a curtain-shape inside a vehicle room on a window of the vehicle;
   a plurality of inflaters for expanding and developing the bag bodies;
   a plurality of pipes for connecting the plurality of inflaters with the bag bodies, wherein the plurality of pipes cross each other; and
   an interior material for arranging the plurality of inflaters well organized therein.

5. The passenger protective device according to claim 1, wherein the plurality of pipes includes a first pipe and a second pipe.

6. The passenger protective device according to claim 5, wherein the plurality of bag bodies includes a front bag body and a rear bag body.

7. The passenger protective device according to claim 6, wherein the plurality of inflaters includes a front inflater and a rear inflater.

8. The passenger protective device according to claim 7, wherein the first pipe connects the front bag body to the rear inflater, and the second pipe connects rear bag body to the front inflater.

* * * * *